United States Patent
Eggleston et al.

(10) Patent No.: US 12,422,689 B2
(45) Date of Patent: Sep. 23, 2025

(54) APPARATUS FOR POSITIONING COMPONENTS IN OPTICAL SYSTEMS

(71) Applicant: Nokia Technologies Oy, Espoo (FI)

(72) Inventors: Michael Eggleston, Columbus, OH (US); Bibek Samanta, Piscataway, NJ (US)

(73) Assignee: NOKIA TECHNOLOGIES OY, Espoo (FI)

(*) Notice: Subject to any disclaimer, the term of this patent is extended or adjusted under 35 U.S.C. 154(b) by 69 days.

(21) Appl. No.: 17/736,390

(22) Filed: May 4, 2022

(65) Prior Publication Data
US 2022/0357584 A1 Nov. 10, 2022

(30) Foreign Application Priority Data

May 6, 2021 (EP) ..................... 21172440

(51) Int. Cl.
*G02B 27/14* (2006.01)
*G02B 26/10* (2006.01)
*G06T 7/70* (2017.01)

(52) U.S. Cl.
CPC ......... *G02B 27/141* (2013.01); *G02B 26/105* (2013.01); *G06T 7/70* (2017.01)

(58) Field of Classification Search
CPC .... G02B 27/141; G02B 26/105; G02B 26/10; G02B 26/0833; G06T 7/70; G01S 17/931;
(Continued)

(56) References Cited

U.S. PATENT DOCUMENTS 7,096,741 B2 8/2006 Schneider
7,297,934 B2 11/2007 Kane
(Continued)

FOREIGN PATENT DOCUMENTS

CN 103293667 A 9/2013
CN 106052592 A 10/2016
(Continued)

OTHER PUBLICATIONS

Milanović et al., "Closed-Loop Control of Gimbal-less MEMS Mirrors for Increased Bandwidth in LiDAR Applications", Proceedings of the SPIE Conference on Laser Radar Technology and Applications XXII, 2017, 13 pages.
(Continued)

*Primary Examiner* — Michael E Teitelbaum
(74) *Attorney, Agent, or Firm* — ALSTON & BIRD LLP

(57) ABSTRACT

An apparatus for positioning at least one adjustable mirror in optical systems such as laser scanning systems. The optical systems could be LiDAR systems or OCT systems or any other suitable systems. The apparatus comprises at least one adjustable mirror configured to enable laser light from a laser light source to be incident on the at least one adjustable mirror and to enable at least some of the laser light reflected by the at least one adjustable mirror to be used for scanning of a sample. The apparatus also comprises at least one image sensor and one or more optical components configured to guide, at least some, laser light reflected by the at least one adjustable mirror towards the at least one image sensor. This enables images obtained by the at least one image sensor to provide an indication of a position of the at least one adjustable mirror. This can enable an existing component of the optical system to be used to determine the position of the adjustable mirror.

20 Claims, 4 Drawing Sheets

Figure 1:
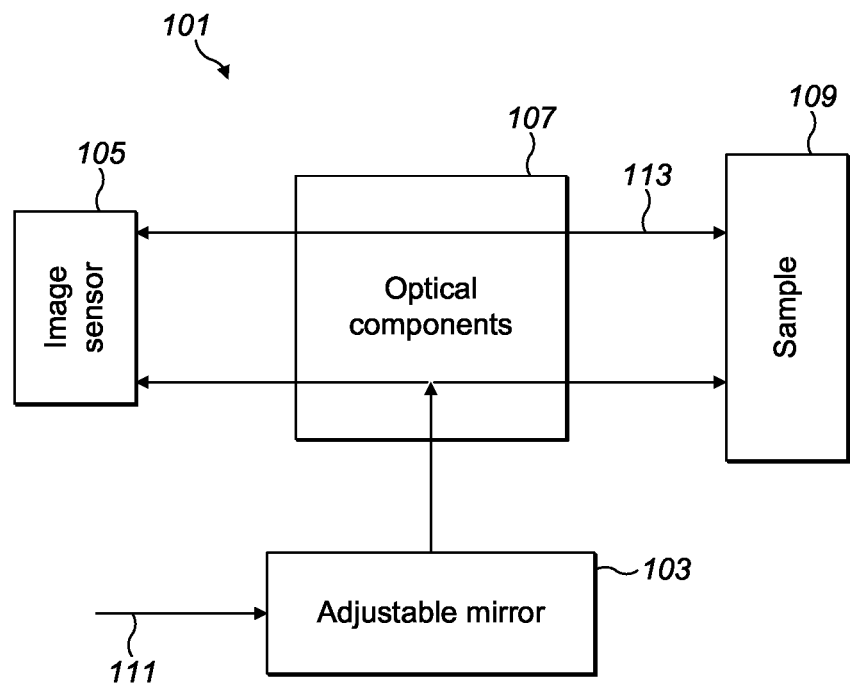

(58) Field of Classification Search
CPC ........ G01S 7/4817; G01S 17/89; G01S 7/481; A61B 5/0066
See application file for complete search history.

(56) References Cited

U.S. PATENT DOCUMENTS

| | | | |
|---|---|---|---|
| 8,396,535 | B2 | 3/2013 | Wang et al. |
| 8,958,057 | B2 | 2/2015 | Kane et al. |
| 10,531,073 | B2 | 1/2020 | Ovsiannikov |
| 10,830,588 | B2 | 11/2020 | Schwendener et al. |
| 11,141,087 | B2* | 10/2021 | Aiyer .................. A61B 5/1455 |
| 2006/0085053 | A1 | 4/2006 | Anderson et al. |
| 2008/0118886 | A1* | 5/2008 | Liang .................. A61B 5/0088 433/29 |
| 2009/0316243 | A1 | 12/2009 | Tsuida |
| 2010/0165322 | A1* | 7/2010 | Kane .................. G01S 7/481 356/4.01 |
| 2019/0007665 | A1 | 1/2019 | Hjelmström et al. |
| 2021/0389586 | A1 | 12/2021 | Pardo |
| 2022/0155240 | A1* | 5/2022 | Otani .................. G02B 3/0006 |

FOREIGN PATENT DOCUMENTS

| | | |
|---|---|---|
| CN | 109218691 A | 1/2019 |
| CN | 109655812 A | 4/2019 |
| EP | 3460472 A1 | 3/2019 |
| EP | 3530175 A1 | 8/2019 |
| EP | 3593708 A1 | 1/2020 |
| EP | 3644031 A1 | 4/2020 |
| EP | 3671108 A1 | 6/2020 |
| WO | 2018/125633 A1 | 7/2018 |
| WO | 2019/162576 A1 | 8/2019 |

OTHER PUBLICATIONS

Yang et al., "Optical MEMS devices for compact 3D surface imaging cameras", Micro and Nano Systems Letters, vol. 7, No. 8, 2019, pp. 1-9.
Pittaluga et al., "Towards a MEMS-based Adaptive LIDAR", arXiv, Oct. 16, 2020, 14 pages.
Lani et al., "2D MEMS scanner integrating a position feedback", MATEC Web of Conferences, vol. 32, 2015, 5 pages.
Extended European Search Report received for corresponding European Patent Application No. 21172440.6, dated Oct. 22, 2021, 7 pages.
Office Action for European Application No. 21172440.6 dated Aug. 14, 2024, 5 pages.
Office Action for Chinese Application No. 202210481028.6 dated Jan. 3, 2025, 12 pages.
Office Action for Chinese Application No. 202210481028.6 dated Jul. 7, 2025, 11 pages.

* cited by examiner

APPARATUS FOR POSITIONING COMPONENTS IN OPTICAL SYSTEMS

RELATED APPLICATION

This application claims priority to the European patent application number 21172440.6, filed on May 6, 2021, the content of which is incorporated herein by reference in its entirety.

TECHNOLOGICAL FIELD

Examples of the disclosure relate to apparatus for positioning components in optical systems. Some relate to apparatus for positioning adjustable mirrors in optical systems such as laser scanning systems.

BACKGROUND

Accurate positioning of components in optical systems such as LiDAR and Optical Coherence Tomography (OCT) systems can enable more accurate images and information to be obtained. However, it can be disadvantageous to add positioning systems and additional positioning components to an optical system because this could increase the complexity and costs of the systems.

BRIEF SUMMARY

According to various, but not necessarily all, examples of the disclosure there may be provided an apparatus comprising:
 at least one adjustable mirror configured to enable laser light from a laser light source to be incident on the at least one adjustable mirror and to enable at least some of the laser light reflected by the at least one adjustable mirror to be used for scanning of a sample;
 at least one image sensor; and
 one or more optical components configured to guide, at least some, laser light reflected by the at least one adjustable mirror towards the at least one image sensor so that one or more images obtained by the at least one image sensor provide an indication of a position of the at least one adjustable mirror.

The laser light may comprise collimated light.

The at least one image sensor and the one or more optical components may be configured to enable the at least one image sensor to capture one or more images of the sample.

The laser light source may be configured to provide light at two different wavelengths.

The one or more optical components may comprise means for splitting the laser light so that the first wavelength of light is directed towards the sample and the second wavelength of light is directed towards the at least one image sensor after reflection from the at least one adjustable mirror.

The one or more optical components may be configured so that an image indicative of a position of the at least one adjustable mirror is provided on a first region of the at least one image sensor and an image of the sample is provided on a second region of the at least one image sensor.

The apparatus may be configured so that an image indicative of a position of the at least one adjustable mirror is provided on the at least one image sensor at a first time and an image of the sample is provided on the at least one image sensor at a second time.

The light source may be configured to provide the laser light in a pulsed signal so that an image indicative of a position of the at least one adjustable mirror is provided on the at least one image sensor at a first time and an image of the sample is provided on the at least one image sensor at a second time.

The apparatus may comprise a controllable aperture configured to switch between allowing light from the sample onto the at least one image sensor and allowing light from the at least one adjustable mirror onto the at least one image sensor.

The light source may be configured to provide light outside of the visible range of light to enable spectral resolution of one or more images indicative of a position of the at least one adjustable mirror and one or more images of the sample captured by the at least one image sensor.

The at least one image sensor may be configured to detect light outside of a visible range.

The apparatus may comprise means for analysing one or more images captured by the at least one image sensor to determine a position of the at least one adjustable mirror, and providing an output indicative of the position of the at least one adjustable mirror.

The apparatus may comprise means for using the output indicative of the position of the at least one adjustable mirror to calibrate one or more components of the apparatus.

The at least one adjustable mirror may comprise a microelectromechanical system mirror.

According to various, but not necessarily all, examples of the disclosure there may be provided an optical coherence tomography device comprising an apparatus as described herein According to various, but not necessarily all, examples of the disclosure there may be provided a LiDAR device comprising an apparatus as described herein.

According to various, but not necessarily all, examples of the disclosure there may be provided an apparatus comprising:
 at least one adjustable mirror configured to enable collimated light from a collimated light source to be incident on the at least one adjustable mirror and to enable at least some of the collimated light reflected by the at least one adjustable mirror to be used for scanning of a sample;
 at least one image sensor; and
 one or more optical components configured to guide, at least some, collimated light reflected by the at least one adjustable mirror towards the at least one image sensor so that images obtained by the at least one image sensor provide an indication of a position of the at least one adjustable mirror.

BRIEF DESCRIPTION

Figure 2:
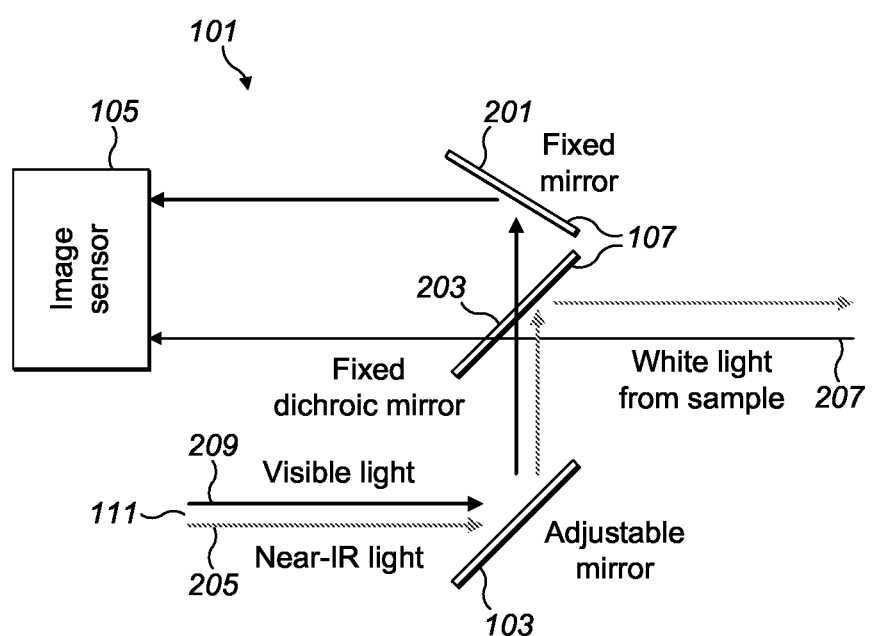
Figure 3:
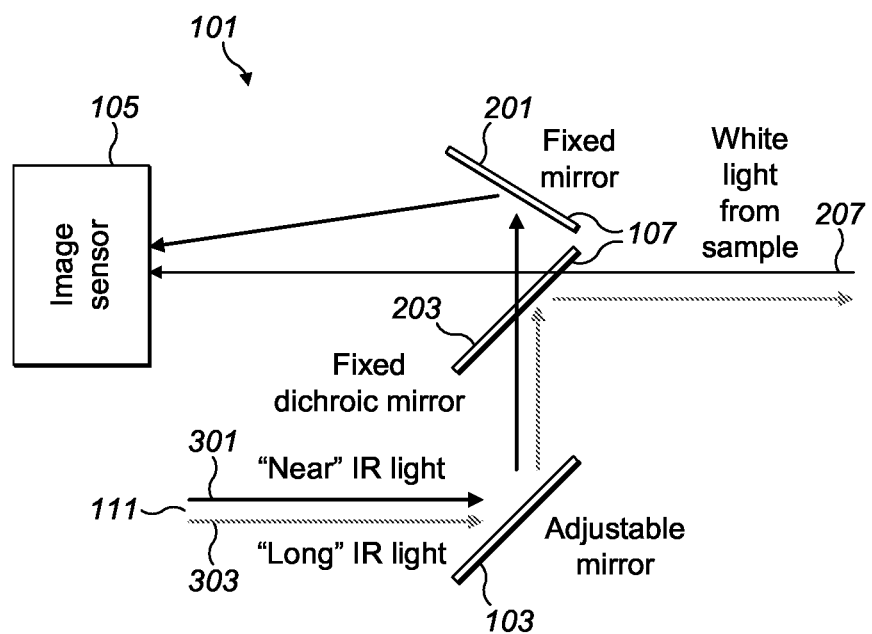
Figure 4:
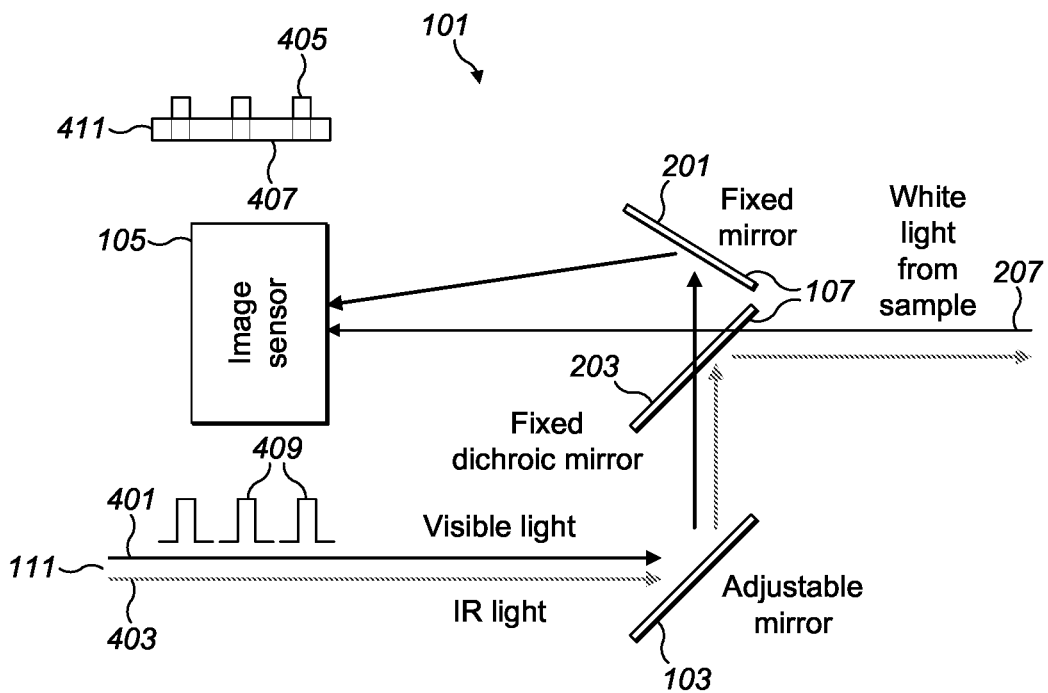
Figure 5:
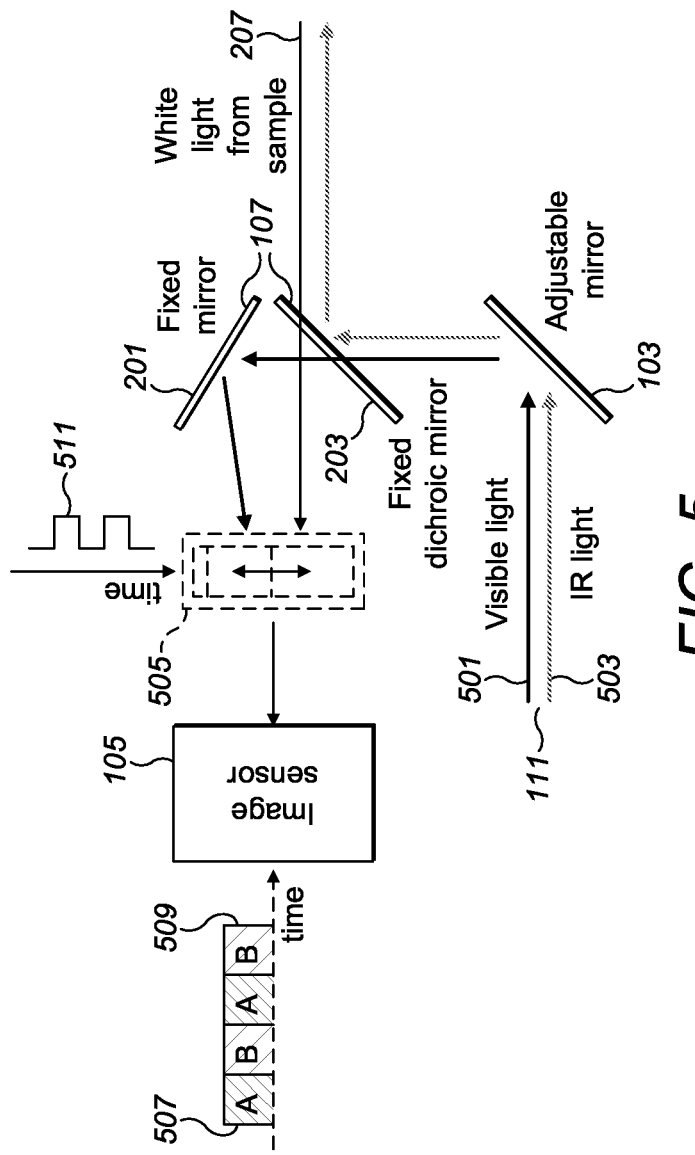
Figure 6:
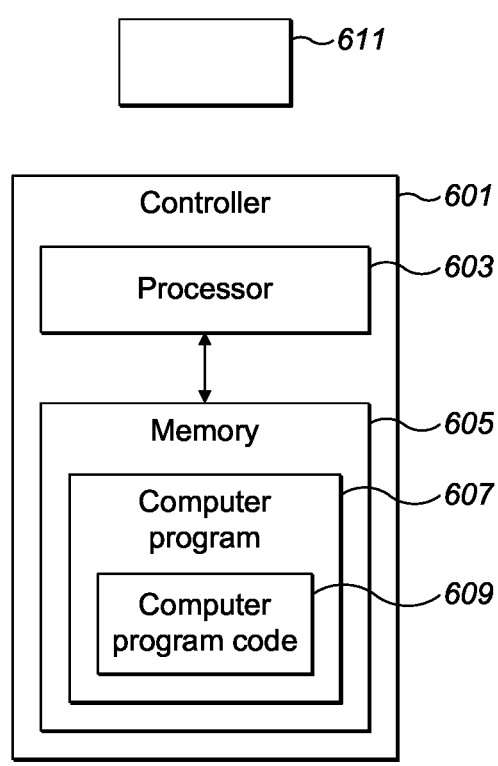

Some examples will now be described with reference to the accompanying drawings in which:
 FIG. 1 shows an example apparatus;
 FIG. 2 shows another example apparatus;
 FIG. 3 shows another example apparatus;
 FIG. 4 shows another example apparatus; and
 FIG. 5 shows another example apparatus; and
 FIG. 6 shows another example apparatus.

DETAILED DESCRIPTION

Examples of the disclosure relate to apparatus for positioning at least one adjustable mirror in optical systems such as laser scanning systems. The optical systems could be LiDAR systems or OCT systems or any other suitable systems. In examples of the disclosure an image sensor can be used to enable the position of the adjustable mirror to be determined. This can enable an existing component of the optical system to be used to determine the position of the adjustable mirror.

FIG. 1 schematically shows an example apparatus 101 according to examples of the disclosure. The example apparatus could be provided within a system such as a LiDAR system or an OCT system or any other system that uses a scanning laser or other collimated light source to obtain images or other information from a sample 109. The LiDAR systems and OCT systems could be provided within consumer devices such as smartphones or tablets. In some examples the LiDAR systems or OCT systems could be provided within other types of devices such as medical imaging devices, vehicles or any other suitable types of devices.

The sample 109 can comprise any object or part of an object that is to be scanned by the optical system that comprises the apparatus 101. The type of sample 109 that is being used can depend on the type of optical system that the apparatus 101 is comprised within. For example, if the apparatus 101 is used within an optical coherence tomography (OCT) system then the sample 109 could comprise a part of a subject's body and the laser light could be used to obtain images or other information from the subject's body. If the apparatus 101 is used within a LiDAR system then the sample 109 could be any object that is positioned in the environment around the apparatus 101. For example, if the LiDAR system is used in a vehicle the sample 109 could be other vehicles or pedestrians or other objects around the vehicle.

The example apparatus 101 shown in FIG. 1 comprises at least one adjustable mirror 103, at least one image sensor 105 and one or more optical components 107. It is to be appreciated that only components that are referred to in the following description are shown in FIG. 1 and that the apparatus 101 can comprise additional components in examples of the disclosure.

The at least one adjustable mirror 103 can comprise any reflective or partially reflective means. The adjustable mirror 103 can comprise a Microelectromechanical system (MEMS) mirror, a thermally controlled mirror or any other suitable type of reflective surface.

The at least one adjustable mirror 103 is positioned so that when the apparatus 101 is in use laser light 111 from a laser light source is incident on the at least one adjustable mirror 103.

The laser light source could be part of the apparatus 101 or, in some examples, a light guide can be used to provide light from the laser light source to the apparatus 101. The laser light source can be configured so that the laser light 111 can be provided at two or more different wavelengths. That is, a first beam of light can be provided at a first wavelength and a second beam of light can be provided at a second, different wavelength.

The at least one adjustable mirror 103 is positioned within the apparatus 101 so that when the apparatus 101 is in use at least some of the laser light 111 reflected by the at least one adjustable mirror 103 is directed towards the sample 109 and so can be used for scanning of the sample 109.

The adjustable mirror 103 is adjustable in that the position of the adjustable mirror 103 can be adjusted so as to enable the laser light 111 to be directed towards different parts of the sample 109. The adjustments of the mirror 103 can comprise changing the angular position of the mirror 103 within the apparatus 101 and/or any other suitable changes in position. The adjustable mirror 103 can be configured to be tilted through a range of different angular positions.

The movement of the adjustable mirror 103 can enable different parts of the sample 109 to be scanned. The position of the adjustable mirror 103 can be controlled by a control signal to enable different parts of the sample 109 to be scanned. The adjustable mirror can be configured to direct laser light onto different parts of the sample 109. The apparatus 101 is configured so that laser light reflected from the sample 109 is directed to the one or more image sensors 105 or back towards the laser light source in order to enable information to be obtained from the sample 109. In examples where the reflected laser light is directed back towards the laser light source, the reflected laser light can be received by one or more sensors (not shown in the Figures), optionally co-located with the laser light source, in order to enable information to be obtained from the sample 109. In order to enable accurate information to be obtained from the sample 109 it is useful to have accurate positioning information of the adjustable mirror 103.

The image sensor 105 can comprise any means which can be configured to detect images. The image sensor 105 can comprise any suitable type of image sensor 105. In some examples the image sensor 105 can comprise a two-dimensional image sensor. For instance, the image sensor 105 can comprise a digital image sensor such as a complementary metal-oxide-semiconductor (CMOS) or a charge-coupled-device (CCD).

The image sensor 105 can be configured to obtain images of the sample 109 that is being scanned by the apparatus 101. The image sensor 105 can be configured to detect visible light from the sample 109. The visible light could be white light 113 or any suitable wavelength of light. The images of the sample 109 that are obtained by the image sensor 105 could be used to provide images to a user of the apparatus 101. This could enable a user to identify the sample 109 and/or to identify which part of the sample 109 is being scanned or for any other suitable purpose.

The one or more optical components 107 can comprise any means which can be configured to direct light onto the image sensor 105. The optical components 107 can comprise one or more optical devices such as one or more fixed mirrors, one or more dichroic mirrors, one or more controllable apertures, an optical lens and/or any other suitable components.

The optical components 107 can be configured to direct the laser light 111 that is reflected by the adjustable mirror 103 onto the image sensor 105. This can enable images obtained by the image sensor 105 to provide an indication of the position of the adjustable mirror 103.

The optical components 107 can also comprise one or more components for directing at least some of the laser light 111 reflected from the adjustable mirror 103 towards the sample 109 so as to enable scanning of the sample 109. For example, the optical components 107 could comprise a beam splitter or dichroic mirror or any other suitable means that directs some of the laser light 111 towards the sample 109 and some of the laser light towards the image sensor 105.

In some examples the apparatus 101 is configured so that the visible light 113 from the sample 109 could pass through one or more optical components 107 before it is incident on the image sensor 105. The one or more optical components 107 can comprise any means that can be configured to direct and focus visible light 113 from the sample 109 onto the image sensor 105.

When the apparatus 101 is in use laser light 111 from a laser light source is provided to the apparatus 101. The laser light source can be part of the apparatus 101 or can be part of a different apparatus. If the laser light source is part of a different apparatus a light guide or other suitable means could be configured to guide the light to the apparatus 101.

The laser light 111 is incident on the adjustable mirror 103. The adjustable mirror 103 is positioned so that the laser light 111 is reflected from the adjustable mirror 103 towards the optical components 107.

In some examples the laser light 111 can comprise two or more different wavelengths and the optical components 107 can be configured to direct a first wavelength of laser light in a first direction and a second wavelength of laser light in a second, different direction In such examples, the optical components 107 can comprise means for splitting the laser light 111 so that the first wavelength of light is directed towards the sample 109 and the second wavelength of light is directed towards the image sensor 105 after reflection from the adjustable mirror 103. This can enable the first wavelength to be used for scanning of the sample 109 and the second wavelength to be used to determine the position of the adjustable mirror 103.

The laser light 111 that is directed towards the sample 109 can be used for scanning of the sample 109. For example, it can be used for OCT or LiDAR scanning or any other suitable type of scanning.

The laser light 111 that is directed towards the image sensor 105 enables images obtained by the at least one image sensor 105 to provide an indication of a position of the at least one adjustable mirror 103.

The image sensor 105 can also be configured to detect white light, or other visible light 113, from the sample 109. This can enable the same image sensor 105 to be used to detect both images of the sample 109 and information indicative of the position of the adjustable mirror 103.

The image sensor 105 and/or the optical components 107 can be configured to enable images of the sample to be disambiguated from the images or other information indicative of the position of the adjustable mirror 103. FIGS. 2 to 4 show different examples which use different configurations to enable the indication of the position of the adjustable mirror 103 to be obtained from the same image sensor 105 that is used to obtain images of the sample.

In some examples the apparatus 101 may comprise means for analysing images captured by the image sensor 105 to determine a position of the adjustable mirror 103. The means can be configured to providing an output indicative of the position of the adjustable mirror 103.

In some examples the apparatus 101 may also comprise means for using the output indicative of the position of the adjustable mirror 103 to calibrate one or more components of the apparatus 101. The means can be configured to calibrate the control signals that are provided to the adjustable mirror 103, the components that cause the movement of the adjustable mirror 103 and/or any other suitable components.

The means for analysing the images and/or calibrating the one or more components of the apparatus 101 can comprise a controller or any other suitable means. Examples of a controller that could be used is shown schematically in FIG. 6 and described below.

FIG. 2 schematically shows an example apparatus 101 which allows for spatial separation of the image of the sample 109 and the indication of the position of the adjustable mirror 103. In this example the image of the sample 109 is detected by a first portion of the image sensor 105 and the information indicative of the position of the adjustable mirror 103 is detected by a second, different portion of the image sensor 105.

The apparatus 101 in FIG. 2 is configured so that laser light 111 is incident on an adjustable mirror 103. In this example the laser light 111 that is provided to the apparatus 101 comprises two different wavelengths. The first wavelength comprises near infrared light 205. The near infrared light 205 could have a wavelength between 750 nm and 2500 nm. The near infrared light 205 is used for scanning of the sample 109. The second wavelength comprises visible light 209. The visible light 209 could have a wavelength between 380 nm to 740 nm. The visible light 209 is used for providing information indicative of the position of the adjustable mirror 103. Other wavelengths of laser light 111 could be used in other examples of the disclosure. The wavelengths of laser light 111 that are used can be dependent upon the type of sample 109 that is to be scanned, the type of image sensor 105 that is used and/or any other suitable factor.

In the example of FIG. 2 both of the components of the laser light 111 are incident on the adjustable mirror 103. Both of the components of the laser light 111 are reflected from the adjustable mirror 103 towards the optical components 107.

In this example the near infrared light 205 is to be used for scanning the sample 109 (the sample 109 is not shown in FIG. 2). The apparatus 101 is configured so that the near infrared light 205 is reflected from the adjustable mirror 103 to the one or more optical components 107. In the example of FIG. 2 the optical components 107 comprise means for directing the near infrared light 205 towards the sample 109.

In this example the optical components 107 comprise a dichroic mirror 203 that reflects the near infrared light 205 towards the sample 109 but allows the visible light 209 to pass through. Other means for directing the near infrared light 205 towards the sample 109 could be used in other examples of the disclosure.

In the example of FIG. 2 the dichroic mirror 203 is a fixed mirror. That is the dichroic mirror 203 does not move relative to other components of the apparatus 101 such as the image sensor 105 and other optical components 107.

The optical components 107 are configured so that the visible light 209 that passes through the dichroic mirror 203 is incident on a fixed mirror 201. The fixed mirror 201 can comprise any reflective means that is configured to direct the visible light 209 towards the image sensor 105. The fixed mirror 201 is fixed in position relative to other components of the apparatus 101. Other means for directing the visible light 209 to the image sensor 105 can be used in other examples of the disclosure.

The fixed mirror 201 is configured to direct the visible light 209 to a first portion of the image sensor 105. This enables information indicative of the position of the adjustable mirror 103 to be detected by the first portion of the image sensor 105. In some examples an image of the adjustable mirror 103, or a portion of the adjustable mirror 103, can be detected on the first portion of the image sensor 105.

The optical components 107 are also configured to enable white light 207 from the sample 109 to pass through and be incident on the image sensor 105. In the example of FIG. 2 the dichroic mirror 203 is configured to allow white light 207 or components of the while light 207 to pass through and be incident on the image sensor 105. This enables images of the sample 109 to be obtained.

In the example of FIG. 2 the white light 207 from the sample 109 is incident on a second portion of the image sensor 105. The second portion is different to the first portion. The first portion of the image sensor 105 and the second portion of the image sensor 105 comprise different areas of the image sensor 105. The different areas can be non-overlapping so that there is no overlap, or substantially no overlap, between the information indicative of the position of the adjustable mirror 103 and the images of the sample 109. Therefore, the images obtained by the first portion of the image sensor 105 provide information indicative of the position of the adjustable mirror 103 while the images obtained by the second portion of the image sensor 105 provide images of the sample 109.

In the example of FIG. 2 the image sensor 105 can simultaneously provide an image of the sample 109 and information indicative of the position of the adjustable mirror 103.

FIG. 3 schematically shows another example apparatus 101 which allows for spectral separation of the image of the sample 109 and the indication of the position of the adjustable mirror 103. In this example different wavelengths of laser light 111 are used to obtain the images of the sample 109 and the information indicative of the position of the adjustable mirror 103. The image sensor 105 can be configured to de-multiplex the different wavelengths of light.

In the example of FIG. 3 the apparatus 101 is configured so that the laser light 111 that is incident on the adjustable mirror 103 comprises two different wavelengths. In this example the first wavelength comprises long infrared light 303. The long infrared light 303 could have a wavelength between 950 nm to 3000 nm. The long infrared light 303 is used for scanning the sample 109. The second wavelength of light is outside of the visible range. In this example the second wavelength of light comprises near infrared light 301. The near infrared light 301 could have a wavelength between 750 nm and 950 nm. The near infrared light 301 is used for obtaining information indicative of the position of the adjustable mirror 103. Other wavelengths of laser light 111 could be used in other examples of the disclosure.

As shown in FIG. 3 both of the components of the laser light 111 are incident on the adjustable mirror 103 and both of the components of the laser light 111 are reflected from the adjustable mirror 103 towards the optical components 107

In this example the long infrared light 303 is to be used for scanning the sample 109 (the sample 109 is not shown in FIG. 3). The apparatus 101 is configured so that the long infrared light 303 is reflected from the adjustable mirror 103 to the one or more optical components 107. In the example of FIG. 3 the optical components 107 comprise means for directing the long infrared light 303 towards the sample 109. In this example the optical components 107 comprise a fixed dichroic mirror 203 that reflects the long infrared light 303 towards the sample 109 but allows the near infrared light 301 to pass through.

The optical components 107 are configured so that the near infrared light 301 that passes through the dichroic mirror 203 is incident on a fixed mirror 201. The fixed mirror 201 is configured to direct the near infrared light 301 to a first portion of the image sensor 105. This enables information indicative of the position of the adjustable mirror 103 to be detected by the first portion of the image sensor 105.

The optical components 107 are also configured to enable white light 207 from the sample 109 to pass through and be incident on the image sensor 105. In the example of FIG. 3 the dichroic mirror 203 is configured to allow white light 207 to pass through and be incident on the image sensor 105 so as to enable images of the sample 109 to be obtained.

In the example of FIG. 3 the white light 207 from the sample 109 is incident on the same first portion of the image sensor 105 as the near infrared light 301. The image of the sample 109 overlaps with the information indicative of the position of the adjustable mirror 103.

In this example the image sensor 105 is configured to detect light outside of the visible range. The image sensor 105 is configured to detect an image of the sample 109 using light within the visible range and is configured to detect information indicative of the position of the adjustable mirror 103 using light that it outside of the visible range. In this example the image sensor 105 can be an RGB-IR (red, green, blue-infrared) sensor or any other suitable type of sensor that can detect the different wavelengths of light that are used. In this example the image of the sample 109 comprises RGB colours while the information indicative of the position of the adjustable mirror 103 uses near-infra red light 301. This enables the different signals to be separated by a sub-pixel response of the image sensor 105.

Therefore, in the example of FIG. 3 the image sensor 105 can simultaneously provide an image of the sample 109 and information indicative of the position of the adjustable mirror 103 through spectral de-multiplexing.

It is to be appreciated that variations to the example shown in FIG. 3 could be used. For instance, if a beam splitter were used in place of the dichroic mirror 203 this could enable the same wavelength of infrared light 303 that is used for scanning the sample 109 to also be used for providing the information indicative of the position of adjustable mirror 103. Therefore, in such examples the laser light 111 could comprise a single wavelength that could be in any suitable part of the infrared spectrum.

FIG. 4 schematically shows another example apparatus 101 that allows for temporal demultiplexing of the image of the sample 109 and information indicative of the position of the adjustable mirror 103. In this example an image of the sample 109 is provided on the image sensor 105 at a first time and information indicative of the position of the adjustable mirror 103 is provided on the image sensor 105 at a second time.

The apparatus 101 in FIG. 4 is configured so that laser light 111 is incident on an adjustable mirror 103. In this example the laser light 111 that is provided to the apparatus 101 comprises two different wavelengths. The first wavelength comprises infrared light 403. The infrared light 403 could have a wavelength anywhere in the infrared range of the spectrum. The infrared light 403 could have a wavelength between 750 nm and 2500 nm. The infrared light 403 is used for scanning of the sample 109.

The second wavelength comprises visible light 401. The visible light 401 could have a wavelength between 740 nm to 380 nm. Other wavelengths of light could be used in other examples of the disclosure. The visible light 401 is used for obtaining information indicative of the position of the adjustable mirror 103.

In the example of FIG. 4 the visible light 401 comprises a modulated signal. The modulated signal comprises a series of pulses 409. The pulses 409 are provided at regular intervals and at a predetermined frequency. Any suitable frequency can be used for the modulation of the visible light 401.

Both of the components of the laser light 111 are incident on the adjustable mirror 103 and are reflected from the adjustable mirror 103 towards the optical components 107

In this example the infrared light 403 is to be used for scanning the sample 109 (the sample 109 is not shown in FIG. 4). The apparatus 101 is configured so that the infrared light 403 is reflected from the adjustable mirror 103 to the one or more optical components 107. In the example of FIG. 4 the optical components 107 comprise means for directing the infrared light 403 towards the sample 109. In this example the optical components 107 comprise a dichroic mirror 203 that reflects the infrared light 403 towards the sample 109 but allows the visible light 401 to pass through.

The optical components 107 are configured so that the visible light 401 that passes through the dichroic mirror 203 is incident on a fixed mirror 201. The fixed mirror 201 is configured to direct the visible light 401 to a first portion of the image sensor 105.

The optical components 107 are also configured to enable white light 207 from the sample 109 to pass through and be incident on the image sensor 105. In the example of FIG. 4 the dichroic mirror 203 is configured to allow white light 207 to pass through and be incident on the image sensor 105. This enables images of the sample 109 to be obtained.

In the example of FIG. 4 the white light 207 from the sample 109 is incident on the same first portion of the image sensor 105 as the modulated visible light 401. The image of the sample 109 overlaps with the information indicative of the position of the adjustable mirror 103.

In this example the modulation of the visible light 401 results in a variation of the pixel intensity 411 of the image sensor 105. The pixel intensity 411 comprises a series of pulses 405 having the same frequency as the pulses 409 of the modulated visible light 401.

The pulses 405 comprise time periods during which the pixel intensity 411 is increased due to the modulation of the visible light 401. The pulses in the pixel intensity 411 can therefore provide information indicative of the position of the adjustable mirror 103.

In the time periods between the pulses the pixel intensity 411 has lower intensity regions 407. In these lower intensity regions 407 the image sensor 105 can be functioning as a camera and can obtain images of the sample 109.

Therefore, in the example of FIG. 4 the image sensor 105 detects a pulsed signal so that an image indicative of a position of the at least one adjustable mirror is provided on the image sensor 105 at a first time and an image of the sample 109 is provided on the image sensor 105 at a second time. The image sensor 105 can provide an image of the sample 109 and information indicative of the position of the adjustable mirror 103 by demultiplexing the signal from the image sensor 105 to extract the modulated signal from the un-modulated signal.

FIG. 5 schematically shows another example apparatus that allows for temporal demultiplexing of the image of the sample 109 and information indicative of the position of the adjustable mirror 103. In this example a controllable aperture 505 is provided within the optical components 107 so that an image of the sample 109 is provided on the image sensor 105 at a first time and an information indicative of the position of the adjustable mirror 103 is provided on the image sensor 105 at a second time.

The apparatus 101 in FIG. 5 is configured so that laser light 111 is incident on an adjustable mirror 103. In this example the laser light 111 that is provided to the apparatus 101 comprises two different wavelengths. The first wavelength comprises infrared light 503. The infrared light 503 could have a wavelength anywhere in the infrared range of the spectrum. The infrared light 503 could have a wavelength between 750 nm and 2500 nm. The infrared light 503 can be used for scanning of the sample 109.

The second wavelength comprises visible light 501. The visible light 501 could have a wavelength between 740 nm to 380 nm. Other wavelengths of light could be used in other examples of the disclosure. The visible light 501 can be used for obtaining information indicative of the position of the adjustable mirror 103.

Both of the components of the laser light 111 are incident on the adjustable mirror 103 and both of the components of the laser light 111 are reflected from the adjustable mirror 103 towards the optical components 107.

In this example the infrared light 503 is to be used for scanning the sample 109 (the sample 109 is not shown in FIG. 5). The apparatus 101 is configured so that the infrared light 503 is reflected from the adjustable mirror 103 to the one or more optical components 107. In the example of FIG. 5 the optical components 107 comprise means for directing the infrared light 503 towards the sample 109. In this example the optical components 107 comprise a dichroic mirror 203 that reflects the infrared light 503 towards the sample 109 but allows the visible light 501 to pass through.

The optical components 107 are configured so that the visible light 501 that passes through the dichroic mirror 203 is incident on a fixed mirror 201. The fixed mirror 201 is configured to direct the visible light 501 to a first portion of the image sensor 105.

The optical components 107 are also configured to enable white light 207 from the sample 109 to pass through and be incident on the image sensor 105. In the example of FIG. 5 the dichroic mirror 203 is configured to allow white light 207 to pass through and be incident on the image sensor 105 so as to enable images of the sample 109 to be obtained by the image sensor 105

In the example of FIG. 5 the white light 207 from the sample 109 is incident on the same first portion of the image sensor 105 as the visible light 501. The image of the sample 109 overlaps with the information indicative of the position of the adjustable mirror 103.

In the example of FIG. 5 the optical components 107 also comprise a controllable aperture 505. The controllable aperture 505 is configured to switch between allowing light from the sample 109 onto the at least one image sensor 105 and allowing light from the adjustable mirror 103 onto the image sensor 105. The controllable aperture 505 is configured to move between a first configuration in which the visible light 501 reflected from the adjustable mirror 103 can pass through but the white light 207 from the sample 109 is blocked and a second configuration in which the visible light 501 reflected from the adjustable mirror 103 is blocked but the white light 207 from the sample 109 can pass through.

The controllable aperture 505 can be controlled by a modulated input signal 511. The modulated input signal 511 can control the frequency with which the controllable aperture moves between the different configurations.

The image sensor 105 therefore has two different states dependent upon the configuration of the controllable aperture 505. In a first state 507 the image sensor 105 detects the visible light 501 from the adjustable mirror 103 and so acts to determine the position of the adjustable mirror 103. In the second state 509 the image sensor 105 detects white light from the sample 109 and so acts to obtain images of the sample 109. The image sensor 105 alternates between these two states as the controllable aperture 505 alternates between the different configurations.

FIG. 6 shows an example controller 601 that can be used to analyse images obtained by the image sensor 105 and/or calibrate one or more components of the apparatus 101.

In the example of FIG. 6 the implementation of the controller 601 can be as controller circuitry.

In some examples the controller 601 can be implemented in hardware alone, have certain aspects in software including firmware alone or can be a combination of hardware and software (including firmware).

As illustrated in FIG. 6 the controller 601 can be implemented using instructions that enable hardware functionality, for example, by using executable instructions of a computer program 607 in a general-purpose or special-purpose processor 603 that can be stored on a computer readable storage medium (disk, memory etc.) to be executed by such a processor 603.

The processor 603 is configured to read from and write to the memory 605. The processor 603 can also comprise an output interface via which data and/or commands are output by the processor 603 and an input interface via which data and/or commands are input to the processor 603.

The memory 605 is configured to store a computer program 607 comprising computer program instructions (computer program code 609) that controls the operation of the controller 601 when loaded into the processor 603. The computer program instructions, of the computer program 607, provide the logic and routines that enables the controller 601 to perform the analysing of the images and/or the calibration of the apparatus 101. The processor 603 by reading the memory 605 is able to load and execute the computer program 607.

The controller therefore comprises: at least one processor 603; and at least one memory 605 including computer program code 609, the at least one memory 605 and the computer program code 609 configured to, with the at least one processor 603, cause the controller at least to perform:

analysing one or more images captured by the at least one image sensor 105 to determine a position of the at least one adjustable mirror 103, and providing an output indicative of the position of the at least one adjustable mirror 103; and/or using the output indicative of the position of the at least one adjustable mirror 103 to calibrate one or more components of the apparatus 101.

As illustrated in FIG. 6 the computer program 607 can arrive at the controller 601 via any suitable delivery mechanism 611. The delivery mechanism 611 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 607. The delivery mechanism can be a signal configured to reliably transfer the computer program 607. The controller 601 can propagate or transmit the computer program 607 as a computer data signal. In some examples the computer program 607 can be transmitted to the controller 601 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

The computer program 607 comprises computer program instructions for causing a controller 601 to perform at least the following:

analysing one or more images captured by the at least one image sensor 105 to determine a position of the at least one adjustable mirror 103, and providing an output indicative of the position of the at least one adjustable mirror 103; and/or using the output indicative of the position of the at least one adjustable mirror 103 to calibrate one or more components of the apparatus 101.

The computer program instructions can be comprised in a computer program 607, a non-transitory computer readable medium, a computer program product, a machine readable medium. In some but not necessarily all examples, the computer program instructions can be distributed over more than one computer program 607.

Although the memory 605 is illustrated as a single component/circuitry it can be implemented as one or more separate components/circuitry some or all of which can be integrated/removable and/or can provide permanent/semi-permanent/dynamic/cached storage.

Although the processor 603 is illustrated as a single component/circuitry it can be implemented as one or more separate components/circuitry some or all of which can be integrated/removable. The processor 603 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software might not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Examples of the disclosure therefore provide an apparatus 101 for determining a position of an adjustable mirror 103 within an apparatus 101 used for laser scanning of a sample 109. The information indicative of the position of the adjustable mirror 103 can be used to calibrate the apparatus 101. For example, a control input can be provided to the adjustable mirror 103 and the expected position of the adjustable mirror 103 in response to the control input can be compared to the actual position of the adjustable mirror 103. This information can then be provided to a feedback loop to allow for adjustments of the position of the adjustable mirror 103, and/or the control signals.

In the above described examples the light source is a laser light source and the light used to detect the position of the adjustable mirror 103 comprises laser light. In other examples of the disclosure collimated light, or any other suitable type of light could be used.

Examples of the disclosure provide an apparatus 101 for determining a position of one or more adjustable mirrors 103 within a laser scanning system. The apparatus is low cost because it can be implemented using existing image sensor 105. The image sensor 105 could be provided within the apparatus 101 for the purpose of imaging the sample 109 and so using the same image sensor 105 to detect the position of the adjustable mirror does not require any additional sensors. The use of existing components of the apparatus 101 for a second purpose also provides the benefit that the addition of the positioning system does not increase the size or complexity of the apparatus 101. This can make the apparatus 101 suitable for use in a wide range of laser scanning systems.

The apparatus 101 can also be configured so that it can detect the position of the at least one adjustable mirror 103 over a large angular displacement. The large angular displacement could be of the order of ten degrees. In some examples the large angular displacement could comprise a range that is greater than ten degrees.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasize an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
a laser light source;
at least one adjustable mirror configured to enable laser light from the laser light source to be incident on the at least one adjustable mirror and to enable at least some of the laser light reflected by the at least one adjustable mirror to be used for scanning of a sample, wherein the at least one adjustable mirror is configured to reflect two different wavelengths of laser light from the laser light source including a first wavelength, comprising infrared light, and a second wavelength, comprising visible light;
at least one image sensor; and
one or more optical components configured to guide a first portion of the laser light reflected by the at least one adjustable mirror towards the at least one image sensor so that one or more images obtained by the at least one image sensor provide an indication of a position of the at least one adjustable mirror, wherein the at least one image sensor is configured to provide an image of the sample and the indication of the position of the at least one adjustable mirror simultaneously, and to direct a second portion of the laser light reflected by the at least one adjustable mirror towards the sample.

2. An apparatus as claimed in claim 1 wherein the at least one image sensor and the one or more optical components are configured to enable the at least one image sensor to capture one or more images of the sample.

3. An apparatus as claimed in claim 1 wherein the one or more optical components are configured to split the laser light so that the first wavelength of light is directed towards the sample and the second wavelength of light is directed towards the at least one image sensor after reflection from the at least one adjustable mirror.

4. An apparatus as claimed in claim 1 wherein the one or more optical components are configured so that an image indicative of the position of the at least one adjustable mirror is provided on a first region of the at least one image sensor and an image of the sample is provided on a second region of the at least one image sensor, the image of the sample being obtained from light of a different wavelength than a wavelength of the second portions of the laser light.

5. An apparatus as claimed in claim 1 wherein the apparatus is configured so that an image indicative of the position of the at least one adjustable mirror is provided on the at least one image sensor at a first time and an image of the sample is provided on the at least one image sensor at a second time, the image of the sample being obtained from light of a different wavelength than a wavelength of the second portions of the laser light.

6. An apparatus as claimed in claim 5 wherein the light source is configured to provide the laser light in a pulsed signal so that an image indicative of the position of the at least one adjustable mirror is provided on the at least one image sensor at a first time and an image of the sample is provided on the at least one image sensor at a second time, the image of the sample being obtained from light of a different wavelength than a wavelength of the second portions of the laser light.

7. An apparatus as claimed in claim 5 comprising a controllable aperture configured to switch between allowing light from the sample onto the at least one image sensor and allowing light from the at least one adjustable mirror onto the at least one image sensor.

8. An apparatus as claimed in claim 1 wherein the light source is configured to provide light outside of the visible range of light to enable spectral resolution of one or more images indicative of the position of the at least one adjustable mirror and one or more images of the sample captured by the at least one image sensor, and wherein the at least one image sensor is configured to detect light outside of a visible range.

9. An apparatus as claimed in claim 1 further comprising at least one processor and at least one memory including computer program code, the at least one memory and the computer program code configured to, with the at least one processor, cause the apparatus at least to: analyze one or more images captured by the at least one image sensor to determine a position of the at least one adjustable mirror, and provide an output indicative of the position of the at least one adjustable mirror.

10. An apparatus as claimed in claim 9 wherein the computer program code with the at least one processor are further configured to cause the apparatus to: use the output indicative of the position of the at least one adjustable mirror to calibrate at least one of the one or more optical components of the apparatus.

11. An apparatus as claimed in claim 1, wherein the apparatus is an optical coherence tomography device.

12. An apparatus as claimed in claim 1, wherein the apparatus is a LiDAR device.

13. An apparatus as claimed in claim 1 wherein the adjustable mirror comprises at least one of a microelectromechanical system (MEMS) mirror, or a thermally controlled mirror.

14. A non-transitory computer readable medium comprising program instructions stored thereon for causing an apparatus according to claim 1 to perform:
determining a position of the at least one adjustable mirror based on (i) analyzing one or more images captured by the at least one image sensor and (ii) analyzing a plurality of pulses captured by the at least one image sensor for one or more time periods in which a pixel intensity increased;
providing an output indicative of the position of the at least one adjustable mirror; and
using the output indicative of the position of the at least one adjustable mirror to calibrate the one or more optical components of the apparatus.

15. The non-transitory computer readable medium of claim 14, wherein the laser light comprises collimated light.

16. The non-transitory computer readable medium of claim 14, wherein the laser light source is configured to provide light at two different wavelengths.

17. The non-transitory computer readable medium of claim 14, wherein the adjustable mirror comprises at least one of a microelectromechanical system (MEMS) mirror, or a thermally controlled mirror.

18. An apparatus as claimed in claim 1, wherein the second wavelength comprises a modulated signal comprising a plurality of pulses provided at a regular interval and at a predetermined frequency.

19. The non-transitory computer readable medium of claim 14, wherein the image of the sample overlaps with the information indicative of the position of the at least one adjustable mirror.

20. An apparatus as claimed in claim 1, wherein the at least one image sensor is configured to provide the image of the sample and the indication of the position of the at least one adjustable mirror simultaneously via spectral demultiplexing.

* * * * *